United States Patent

Mann

[15] 3,638,816

[45] Feb. 1, 1972

[54] HINGED UNLOADING AUGER FOR GRINDER-MIXER

[72] Inventor: William W. Mann, Talmage, Pa.

[73] Assignee: Sperry Rand Corporation, New Holland, Pa.

[22] Filed: Mar. 30, 1970

[21] Appl. No.: 23,546

[52] U.S. Cl. ....................214/521, 214/83.26, 214/83.32
[51] Int. Cl. ..................................................B60p 1/42
[58] Field of Search ....................214/522, 83.26, 83.32, 521

[56] References Cited

UNITED STATES PATENTS

| | | | |
|---|---|---|---|
| 2,772,767 | 12/1956 | Seifert | 214/83.26 X |
| 3,498,483 | 3/1970 | Meharry | 214/83.26 |
| 3,560,133 | 2/1971 | Ryczek | 214/522 |
| 3,337,068 | 8/1967 | Meharry | 214/83.26 |
| 3,521,767 | 7/1970 | Rossi | 214/83.26 |

*Primary Examiner*—Gerald M. Forlenza
*Assistant Examiner*—Robert J. Spar
*Attorney*—Joseph A. Brown, John C. Thompson, James J. Kennedy and George C. Bower

[57] ABSTRACT

A hinged auger extension for a portable grinder-mixer. The main auger assembly is hingedly secured to the grinder-mixer for swinging movement about vertical and horizontal axes, and the auger extension is hinged for swinging movement between an extended position and a folded position. Winch means are provided for supporting the auger in various positions of adjustment.

7 Claims, 6 Drawing Figures

PATENTED FEB 1 1972

INVENTOR
WILLIAM W. MANN
BY John C. Thompson
ATTORNEY

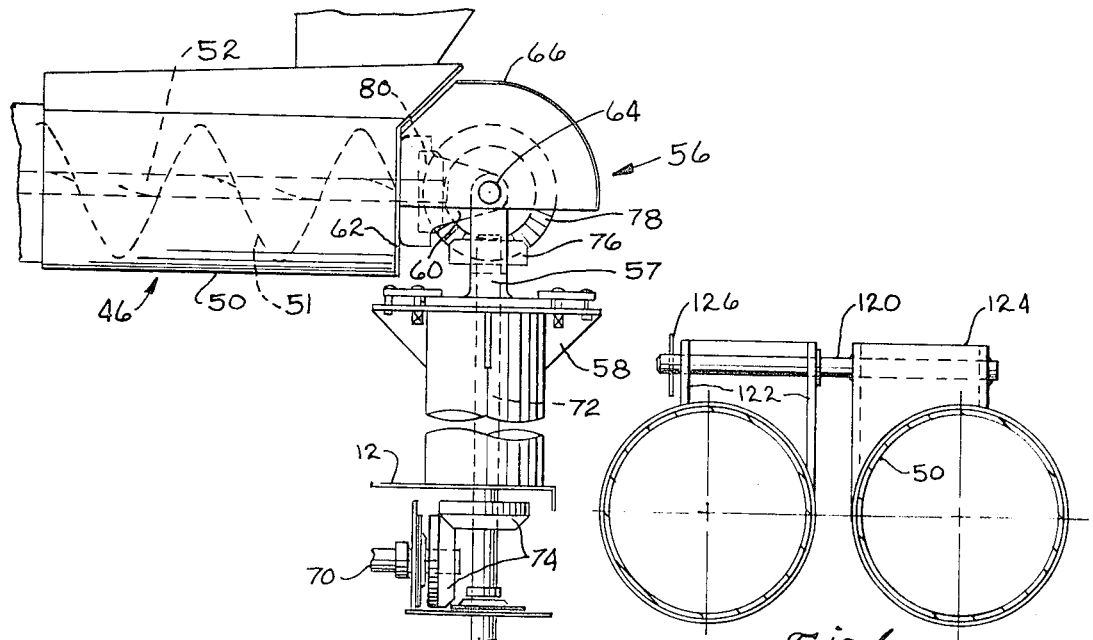

3,638,816

HINGED UNLOADING AUGER FOR GRINDER-MIXER

FIELD OF INVENTION

The present invention relates generally to portable grinder-mixers, and more particularly to a hinged auger extension for a portable grinder-mixer.

DESCRIPTION OF THE PRIOR ART

Many farmers today prepare feed for livestock with portable grinder-mixers. These devices receive stored material, grind the material, and mix it in a mixing tank. The mixed material is customarily discharged to either storage bins or feeders. It is customary when operating a portable grinder-mixer to grind at one location and then to deliver the feed to another location. Sometimes the feed is to be delivered to a feeder which is located over a fence from the roadway on which the grinder-mixer is drawn. In such applications a relatively long discharge auger is required. Also, when discharging feed material to overhead storage bins, a relatively long auger is required.

It should be noted, however, that simply providing a longer auger is not an acceptable solution. A longer auger will interfere with the tractor cab or safety frame during transport, particularly when making turns. Also, a longer auger is not suitable for working in close quarters where a short auger is desirable.

To provide for the requirement of a long auger in certain situations and still be able to cope with situations where a short auger is required, auger extensions have been provided in he past. These auger extensions have been bolted to the end of the main auger tube when in use, and have been entirely removed from the main auger tube when not in use. The installation and removal of these extension augers is a cumbersome and time consuming job. Furthermore, the grinder-mixers have not been provided with a suitable storage place for the extension augers, and thus, it is necessary to provide separate means for the transport of the extensions to remote locations where long augers are required. This frequently causes the extensions to be damaged.

SUMMARY OF THE INVENTION

It is an object of the present invention to overcome the disadvantages of prior art auger extensions, and more specifically to provide a construction in which an auger extension can be easily assembled and disassembled from the main auger of a grinder-mixer, and also to provide a safe storage location for the auger extension when it is not in use.

More specifically, it is an object of this invention to provide a hinged extension auger which can be swung from a folded position to an extended position with a minimum amount of effort, the flighting within the auger extension being drivingly interconnected with the flighting within the main auger assembly when the extension auger is in its extended position.

These and other objects and advantages of this invention will be apparent to those skilled in the art after a consideration of the following detailed description, taken in conjunction with the accompanying drawings in which the preferred form of this invention is illustrated.

FIG. 3 is a side view of the main auger showing its mounting, this view being taken along the lines 3—3 in FIG. 2.

FIG. 4 is a plan view of the main auger assembly and the extension auger assembly showing the manner in which they are hingedly interconnected, this view being taken along the line 4—4 in FIG. 1.

FIG. 5 is a detail showing the manner in which the main auger is drivingly interconnected with the extension auger when the auger assemblies are in the positions shown in FIG. 4.

FIG. 6 is a view taken along the lines 6—6 in FIG. 2 showing the manner in which the auger extension assembly is secured to the main auger assembly when the extension auger assembly is in its folded position.

In the following description right-hand and left-hand reference is determined by standing to the rear of the portable grinder-mixer and facing the direction of travel.

Figure 1:
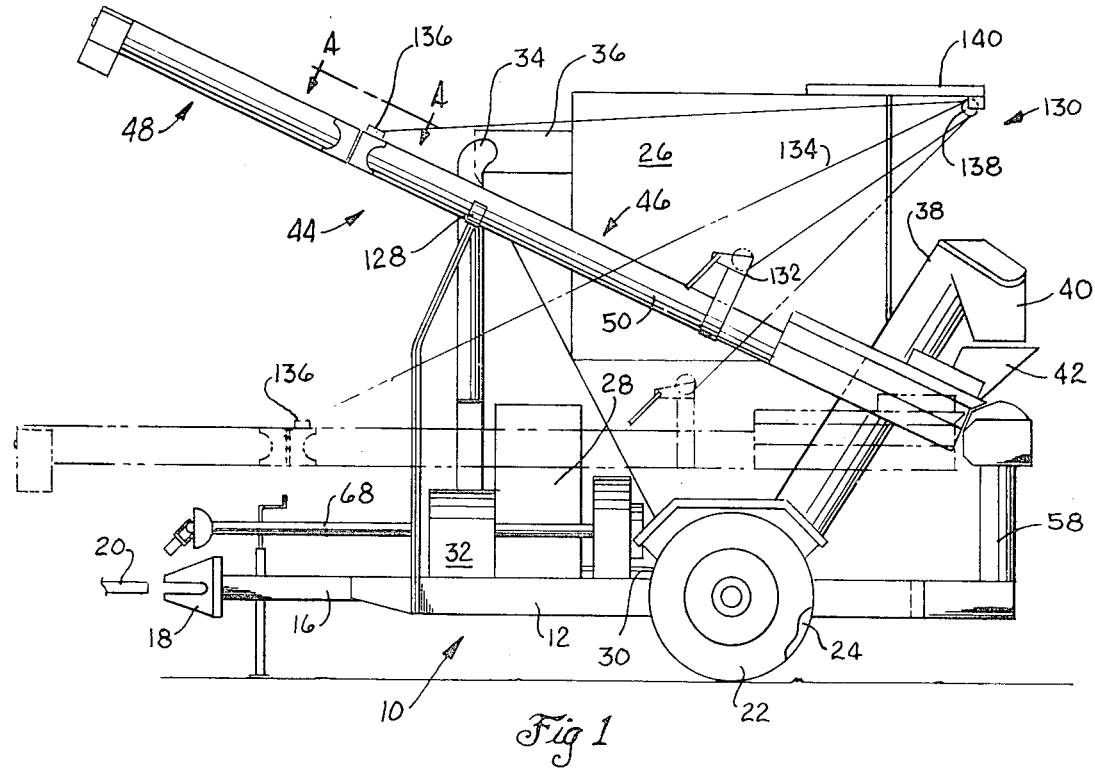
FIG. 1 is a side view of a portable grinder-mixer in which the principals of the present invention have been incorporated.

The portable grinder-mixer in which the present invention is incorporated includes a main frame, indicated generally at 10, the main frame including left and right main frame members 12 and 14, respectively, and forwardly converging frame members 16 which are interconnected at their forward end and to which is secured a forwardly extending clevis 18 which may be secured to a tractor, represented by a tractor drawbar 20 in FIG. 1. The main frame 10 is movably supported upon left and right wheels 22, 24, respectively.

Mounted upon the main frame 10 is a mixing tank 26. Feed material which is to be ground and mixed is initially ground by a hammermill 28 mounted forwardly of the tank 26. Most of the material ground by the hammermill 28 drops through a rearwardly extending feed auger 30 which feeds the ground material to the bottom of the conical bottom of the mixing tank 26. A small portion of the material which is ground by the hammermill 28 tends to be airborne and is drawn forwardly by a fan 32 and blown upwardly through tube 34 to a cyclone cleaner 36. This airborne material settles out and is then introduced into the auger tube 30 at a point rearwardly of the hammermill 28 in a manner not material to the present invention.

After the material has been mixed within the mixing tank 26 it is initially discharged through a delivery means 38. The delivery means 38 is customarily an auger mounted within a tube. The delivery means 38 discharges the feed material through a spout 40 into a chute 42 mounted on the open rear end of the unloading auger assembly indicated generally at 44.

The unloading auger assembly 44 includes a main unloading auger assembly, indicated generally at 46 and an extension auger assembly, indicated generally at 48. The main unloading auger assembly includes a first auger tube 50 and a first auger having flighting 51 secured to a shaft 52. The extension auger assembly includes an extension or second auger tube 53, and an extension or second auger having flighting 54 secured to a shaft 55.

The main unloading auger assembly is supported for swinging movement about vertical and horizontal axes by a universal joint assembly 56. The assembly 56 includes a first yoke 57 which is journaled for rotation about a vertical axis upon a support 58 mounted on the left main frame member 12. A second yoke 60 is secured to the end 62 of the first auger tube 50. A hinge pin 64 pivotally interconnects the yokes 57, 60. A shield 66 is also mounted on the end 62 of the auger tube 50 and overlies the universal joint assembly 56.

The unloading auger, as well as all the other mechanisms of the grinder-mixer, are adapted to be powered from the tractor. To this end the grinder-mixer is provided with a forwardly extending power shaft 68 (FIG. 1) which is adapted to be interconnected with a tractor power takeoff shaft in a conventional manner. The power shaft 68 is drivingly interconnected with the fan, hammermill, mixing tank, and other mechanisms of the grinder-mixer for powering the same in a manner not material to the present invention. In addition, the power shaft 68 is also drivingly interconnected with a rearwardly extending power shaft 70 (FIG. 3) which drives a vertically extending drive shaft 72 by means of a gear set 74. The shaft 72 passes through the center of rotation of the yoke 57. Mounted on the upper end of shaft 72 is a bevel gear 76 which is drivingly interconnected with a large bevel gear 78 journaled on the hinge pin 64. The large bevel gear 78 is in turn drivingly interconnected with another bevel gear 80 fixedly secured to one end of the auger shaft 52 of the auger assembly 46. It can be seen that this with this drive arrangement that the main unloading auger assembly 46 can be swung about a vertically extending axis defined by the drive shaft 72 as well as about a horizontally extending axis defined by the hinge pin 64.

The extension auger assembly 48 is hingedly secured to the main unloading assembly 46 by hinge means indicated generally at 84. The hinge means, which is best shown in FIG. 4, includes a first mounting bracket assembly 86 which is welded or otherwise fixedly secured to the outer end of the first auger tube 50, and a second mounting bracket assembly 88 which is also fixedly secured to the inner end of the extension auger tube 53. Each of the first and second mounting bracket assemblies are provided with hinge means through which a hinge pin 90 may be passed to hingedly interconnect the extension auger assembly to the main unloading assembly. A bell shaped flange 92 is mounted at the inner end of the extension auger assembly 48 and is adapted to closely fit about an end piece 94 mounted on the outer end of the first auger tube 50 to insure that no material will be lost at the juncture of the main and extension unloading augers when the extension auger is in its extended position as shown in FIG. 4. The extension auger assembly 48 is held in its extended position shown in FIG. 4 by an overcenter clamping means indicated generally at 96. The overcenter clamping means 96 includes a hook 98 fixedly secured to the second auger tube 53, a swingable handle 100 mounted to the first auger tube 50 by bracket means 102, and hinge means 104, and a bail 106 which is swingably secured to the handle 100 at 108.

When the extension auger assembly 48 is held in its extended position in the manner shown in FIG. 4 the first auger shaft 52 is drivingly interconnected with the second auger shaft 55 in the manner shown in FIG. 5. Thus, the first auger projection 112 mounted within the inner end of the outer auger shaft 55. A drive lug 116 is welded on the outer end of the auger shaft 52 and will, during operation of the unloading auger assembly, drivingly abut against a driven lug 118 which is welded or otherwise rigidly secured to the inner end of the shaft 55.

Figure 2:
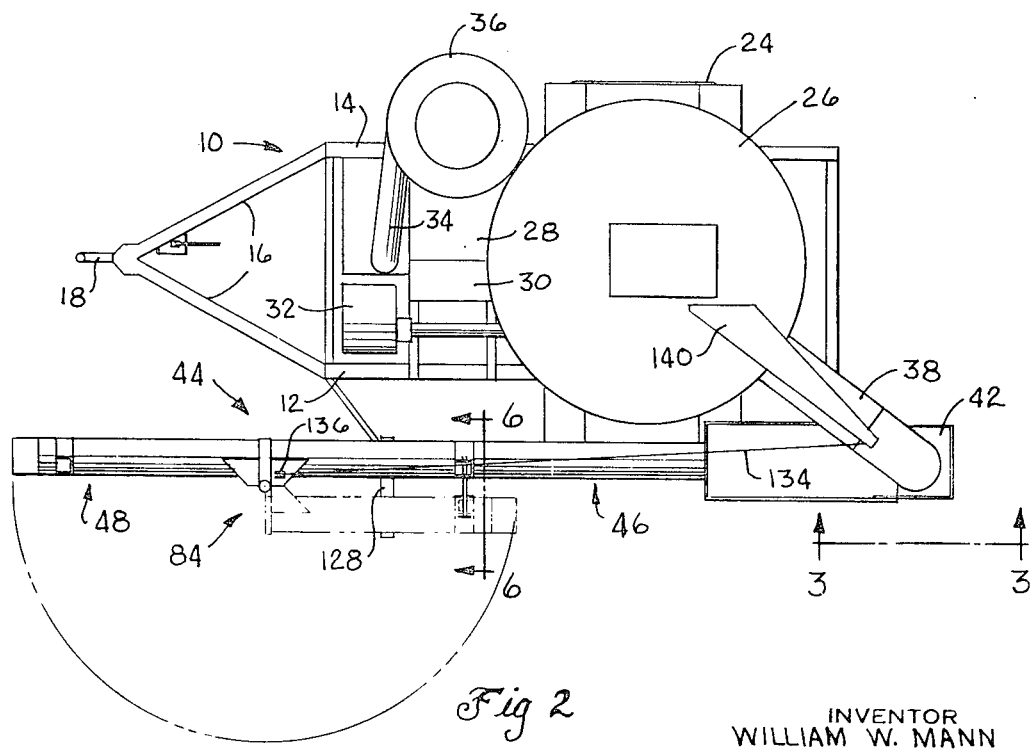
FIG. 2 is a plan view of the grinder-mixer shown in FIG. 1.

When the extension auger assembly 48 is to be held in its folded position, shown in broken lines in FIG. 2, it is held in place by means of a pin 120 which passes through aligned slots (not shown) in upstanding brackets 122 carried by the outer end of the second auger tube 53. The pin 120 is in turn welded to a bracket assembly 124 carried by an intermediate portion of the first auger tube 50. A quick removable pin 126 is passed through an aperture in the pin 120 and is used to hold the extension auger assembly on the pin 120.

When the grinder-mixer is to be transported the unloading auger assembly 44 is placed in a transport position with the main unloading auger assembly 46 supported on a saddle 128 and also with the extension auger assembly 46 in the folded position, shown in dotted lines in FIG. 2, the extension auger assembly also being supported on saddle 128. It should be noted that if the extension auger assembly 48 were in its extended position shown in full lines in FIG. 2 that it would interfere with the tractor cab or safety frame when making left hand turns.

To place the extension auger assembly in its extended position the auger assembly 44 is lowered to the horizontal position shown in FIG. 1. To provide for lowering the auger assembly and also for holding it in various positions of adjustment, a support means indicated generally at 130, is provided. The support means 130 includes a winch 132 mounted on the first auger tube 50 and a cable 134 having one end secured to the first auger tube at 136 an intermediate portion passing over a sheave 138 carried by a support member 140 secured to the upper portion of the tank 26. To lower the unloading auger assembly 44 to the horizontal position shown in FIG. 1, it is only necessary to let some of the cable off the winch 132 until the assembly is in its horizontal position. In this position the auger assembly can be easily moved from its folded position to its extended position and vice versa since it is not necessary to lift the auger extension. Thus, the quick-removable pin 126 is removed from the aperture in pin 120 and the extension auger is swung from its dotted line position to its full line position shown in FIG. 2. When in its full line position the overcenter clamping means is actuated to hold the extension auger in its extended position. When the extension auger is locked into its extended position, the extended auger can be swung to various positions of adjustment for discharging in overhead bins, across fences, etc. It should be noted, however, that if it is desired to discharge feed from the mixing tank 26 in close quarters where it is not desirable to have the extension auger in its extended position that the extension auger can be held in its forward position by the pin 120 and the feed material can be discharged directly from the end of the main unloading auger assembly.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

Having thus described my invention, what I claim is:

1. In a portable grinder-mixer having a wheeled frame, a tank for holding feed material being supported on the frame, a main unloading auger assembly mounted on the frame for swinging movement about vertical and horizontal axes, said unloading auger assembly including a first auger tube and a first auger mounted concentrically within said first tube, means to drive said first auger, and means for delivering feed material from said tank to said unloading auger assembly; the combination therewith of an extension auger assembly including a second auger tube and a second auger mounted concentrically within said second tube, means hingedly securing the second auger tube to the first auger tube about a generally vertical axis perpendicular to the tubes for swinging the extension auger assembly generally horizontally between a folded position and an extended position, fastening means on said auger tubes for securing said second auger tube along the side of said first auger tube when said second auger tube is in the folded position for movement together in vertical and horizontal directions, means operative to drivingly interconnect said first and second augers when said extension auger assembly is in its extended position, and adjustable support means connected to the upper side of said first auger tube to hold the main and extension auger assemblies in various positions of vertical adjustment over the arc of horizontal positions, the parts being so arranged and constructed that feed material may be discharged through the extension auger assembly when it is in its extended position and through the unloading auger assembly when the extension auger assembly is in its folded position in the various vertical and horizontal positions.

2. The apparatus set forth in claim 1 further characterized by the provision of overcenter locking means operable to hold the auger assembly extension in its extended position.

3. The apparatus set forth in claim 1 in which said adjustable support means includes a winch mounted on said main unloading auger, a sheave carried by an upper portion of the tank, and a cable extending from said winch means over said sheave to connection means mounted adjacent the outer end of the main unloading auger assembly.

4. The apparatus set forth in claim 2 further characterized by the overcenter locking means comprising a hook on one of said auger tubes, a mounting on the other of said auger tubes and a linkage having a bail link and a handle-type link, said handle-type link swingably attached to said mounting in a direction away from said hook and said bail link pivotally connected to said handle-type link on the other side of said mounting from said hook to pass said bail link in overcenter relation with said hook.

5. The apparatus set forth in claim 1 further characterized by said adjustable support means comprising a winch mounted upon the main auger tube, cable means, a sheave supported upon an upper portion of the tank, and connection means at the end of the first auger tube for receiving one end of said cable, an intermediate portion of said cable passing over said sheave, the parts being so arranged and constructed that when said unloading auger assembly is supported in a horizontal position the extension auger assembly can be readily swung between its folded position along the side of the first auger tube and extended position at the end of the first auger tube.

6. The apparatus set forth in claim 1 wherein said fastener means is bracketlike means on each of said auger tubes and pinlike means connecting said bracketlike means in the folded position.

7. The apparatus set forth in claim 6 wherein said pinlike means is attached to said bracketlike means on said first auger tube and is detachably coupled to said bracketlike means on said second auger tube.

\* \* \* \* \*